June 17, 1958     O. D. ENGLEHART ET AL     2,838,810

MULTIPLE GLAZED UNIT

Filed July 9, 1954

INVENTORS
OSCAR D. ENGLEHART and
RENATO J. MAZZONI

Oscar Spencer
ATTORNEY

United States Patent Office 2,838,810
Patented June 17, 1958

2,838,810
MULTIPLE GLAZED UNIT

Oscar D. Englehart, Brackenridge, and Renato J. Mazzoni, Tarentum, Pa., assignors to Pittsburgh Plate Glass Company Application July 9, 1954, Serial No. 442,222

1 Claim. (Cl. 20—56.5)

This invention relates to window constructions and has particular relation to multiple glazed units of improved edge construction.

Multiple glazed units comprise two or more sheets of glass spaced one from the other by a suitable marginal edge spacing element to provide an insulating air chamber between the adjacent sheets. Various methods have been employed to achieve a hermetic seal between the edges of the glass sheets and the spacer element. In one type of multiple glazed unit, a calking compound or mastic composition, such as carbon black dispersed in polyisobutylene, is applied in a continuous film around the edges of the sheet and spacer element to provide a seal. A metal channel member of U-shape cross section is then affixed over the edges of the assembled unit.

The mastic composition is pliable and extremely sticky and therefore presents a problem with respect to its uniform application. Also, a mastic composition will give under pressure and can be displaced by uneven pressures exerted by the glass sheets.

In accordance with the present invention, the use of a pliable mastic composition as an edge sealant in a multiple glazed unit has been improved by employing the mastic composition in combination with a resilient backing strip. The mastic composition is extruded onto the backing strip and the mastic and strip are then applied to the edges and around the corners of the assembled unit.

The backing strip acts as cushioning member. It is flexible and resilient and may be made of a number of materials. Strips of polyethylene and strips of natural rubber and synthetic rubbers such as butyl rubber have been found to be highly satisfactory in the practice of the invention. Other synthetic plastic materials which are resilient, moisture resistant and flexible and will adhere to a mastic composition will be readily apparent to those skilled in the art. The strip should be of sufficient thickness so that it has the property of resiliency, for example, 1/32 of an inch to 1/8 of an inch or greater in thickness. It is desired also that the strip be made of moisture resistant non-fibrous material and that it be a good thermal insulator. Fibrous materials such as fabric tapes or paper absorb moisture and act as a wick to transport moisture to any weak spots in the seal.

The invention is further described in conjunction with the drawing in which.

Figure 1:
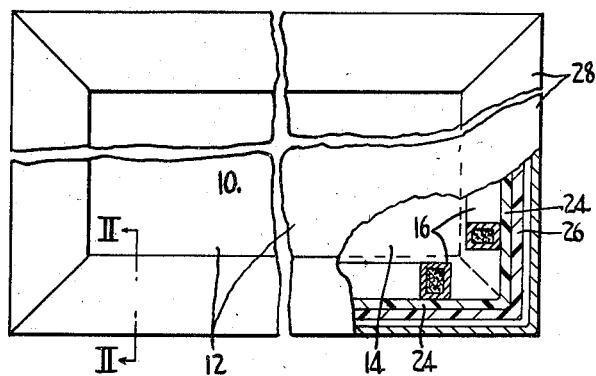
Figure 1 is an elevational view, partly in section, of a multiple glazed unit embodying the principles of the invention.
Figure 2:
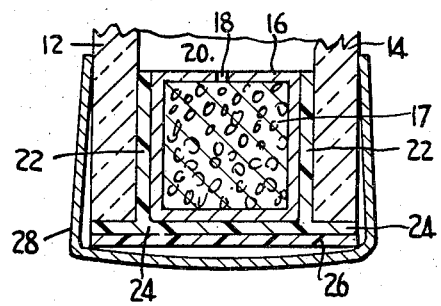
Figure 2 is a fragmentary sectional view taken along lines II—II of Figure 1.

In the drawing, a multiple glazed unit 10 is shown which is comprised of two sheets of glass 12 and 14 arranged in parallel relation. The glass may be tempered, colored, laminated or have other special strength or optical properties. The glass sheets are separated at their marginal edges by a continuous spacer element 16. The spacer element is in the form of a hollow metal tube of rectangular cross-section running completely around the edges of the glass sheets. It is understood that spacer element may be of a different cross-section or may be solid as desired. It is the usual practice for such spacer element to have a dessicant 17 in the inside thereof. The hollow spacer element 16 is provided with spaced openings 18 connecting the interior 20 of the unit with the dessicant 17 so that the moisture from the air within the unit may be absorbed.

The spacer element 16 is adhered to the glass sheets 12 and 14 at their meeting faces by means of a thin continuous film of mastic composition 22. A composition which has been found to be most satisfactory as a mastic is a dispersion of carbon black in polyisobutylene such as is set forth in U. S. Patent Number 2,551,952 granted to Gerald E. Kunkle. Other calking compounds or mastic compositions may be employed but the above compound is preferred. In addition to being between the spacer unit and the glass sheets in their meeting areas, the mastic composition 22 is also provided along the outer edge of the unit overlapping the edges of the glass sheets and spacer elements at 24 so as to provide a continuous moisture-proof seal.

The application of the marginal edge portion 24 of the mastic is carried out after the glass and spacer element have been assembled. Due to the stickiness and difficulty of handling the mastic composition, it has been the practice to extrude it onto a sheet of non-adhering paper to the thickness desired for its application. The mastic and paper were then placed against the edges of the assembled glass and spacer units with the mastic contacting the edges and extending out even with the outer surfaces of the glass sheets 12 and 14. The application was made completely around the unit. The mastic and paper were pressed slightly to insure complete adhesion of the mastic to the edges of the glass and spacer element and also to the mastic 22 adhering the glass and spacer element together. The paper strip had to be removed from the mastic. It could not be allowed to remain in the finished unit because of its susceptibility to moisture. Thereafter, a channel member 28 of U-shape cross-section was affixed around the periphery of the sealed unit.

Figure 3:
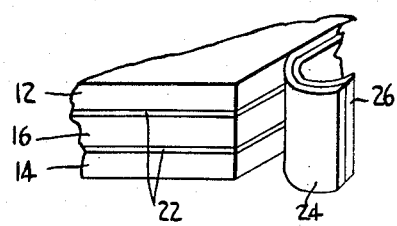
Figure 3 is a fragmentary perspective view of a partially assembled multiple glazed unit.

In accordance with the present invention, the mastic composition is extruded to the desired thickness on a flexible, resilient sheet of polyethylene, butyl rubber or like substance. The polyethylene or butyl rubber strip is of a width corresponding to the thickness of the assembled unit. The thickness of the strip is about the same as the thickness of the mastic composition and may be about 3/64 of an inch. The method of applying the strip 26 and mastic 24 is shown in Figure 3 where the strip and mastic are shown about to be adhered to the edges of glass sheets 12 and 14, spacer element 16 and mastic 22, and wrapped around a corner of the assembled unit.

It is desired that the strip 26 and mastic 24 be wrapped completely around the edge of the unit. This may be done with a continuous strip or by using shorter lengths and overlapping the meeting ends. However, if for economy purposes this is not done, then it is preferred that at least the bottom edge and/or the bottom corners of the unit, as glazed in a window structure, be provided with this strip. The bottom edges of a multiple glazed unit when glazed carry the most weight and therefore are more likely to suffer damage than the other edges of the unit. This is especially so in the areas along the edges where the unit rests on the setting blocks used in glazing. Any tendency for these edges to fracture due to bumps or shocks has been found to be greatly reduced by the use of a cushioning strip 26 in combination with the mastic. As stated above, the strip 26 should be thick enough to be resilient and absorb shock. A strip of polyethylene and a strip of butyl rubber about 3/64 of an inch in thickness have successfully withstood accelerated bump and shock tests when employed in double glazed units using 36" x 48" x 1/4" plate glass.

The channel member 28 is made of metal such as stainless steel. The angle which the flanges or sides of the channel member form with the central portion is slightly less than 90°. When the channel member is affixed to the edges of the glass sheets, these sides are held apart to allow the glass to be inserted therein. After this, they are released and spring back into contact with the faces of the glass sheets. The channel member is thus held on under tension.

The use of a resilient, moisture resistant strip in combination with the mastic composition has resulted in many advantages in the production and use of multiple glazed units. In the construction of the unit, it has eliminated the use of transfer paper and the necessity for the step of removing the transfer paper. The transfer paper could not be left on because of its susceptibility to moisture. Also, the use of the strip has enabled the reduction of the amount of mastic composition required and thus resulted in a saving of more expensive material.

The use of the resilient strip 26 provides a cushioning for the edges of the glass particularly the bottom edge and has reduced breakage of the glass along these edges. The mastic and strip are applied in one operation, with slight tension, particularly at the corners, thus causing better flow of the mastic and sealing of the unit. The corners of a multiple glazed unit of the type described, particularly the lower corners of the unit as glazed are least resistant to moisture penetration. The use of a continuous strip around the corners of the unit has strengthened these corners and made them more resistant to water penetration. The strip does not flow under the weight of the glass and therefore, provides permanent sealing as the corners and permanent cushioning between the glass edges and channel member 28.

Although the present invention has been described with particular reference to the specific details of certain embodiments thereof, it is not intended that such details shall be regarded as limitations upon the scope of the invention except insofar as included in the accompanying claim.

We claim:

A multiple glazed unit comprising a plurality of glass sheets, a marginal edge spacer-dehydrator element between the marginal edges of the glass sheets and extending completely around the periphery thereof and having an edge substantially flush with the outer edges of the glass sheets, an inner layer of moisture and vapor-impermeable tacky mastic between each of the pairs of meeting faces of the spacer-dehydrator element and the marginal edges of said glass sheets adjacent thereto and adhering directly to these meeting faces as the sole bond therebetween, said inner layers of said tacky mastic being flush with the outer edges of said glass sheets and said spacer-dehydrator element, a shock-absorbing and moisture-resistant sealing member bonded to and extending continuously around the edge of said glazed unit, said sealing member comprising a shock-absorbent, moisture-resistant plastic strip having a coextensive layer of a moisture and vapor-impermeable tacky mastic bonded to one surface of said plastic strip, said plastic strip bonded through said mastic layer coextensively to the edges of said glass sheets, said substantially flush edge of said spacer-dehydrator element and each of the tacky mastic layers between said glass sheets and said spacer-dehydrator element, and a channel member surrounding the sealed edges of said glazed unit.

References Cited in the file of this patent

UNITED STATES PATENTS

| 2,618,819 | Goodwillie | Nov. 25, 1952 |
| 2,684,266 | Englehart | July 20, 1954 |

FOREIGN PATENTS

| 110,147 | Great Britain | Apr. 4, 1940 |
| 572,822 | Great Britain | Oct. 16, 1940 |